July 5, 1938.  D. M. SMITH  2,122,729

PISTON EXPANDER

Filed March 25, 1937

INVENTOR;
DALLAS M. SMITH
BY
ATTORNEY

Patented July 5, 1938

2,122,729

UNITED STATES PATENT OFFICE 2,122,729

PISTON EXPANDER

Dallas M. Smith, Kirkwood, Mo.

Application March 25, 1937, Serial No. 133,052

4 Claims. (Cl. 309—12)

My invention relates to piston expanders and more particularly to piston expanders of the type wherein an expanding member is arranged to engage the piston skirt at substantially diametrically opposed points and to exert an expansive force on the skirt to increase the effective diameter thereof.

It is well known that when a piston of an internal combustion engine reciprocates in the cylinder in which it is mounted the parts of the piston sometimes go into a flutter or rapid vibration. The factors causing such flutter are not known. With pistons as now used having split skirts isolated from the piston head so that the skirts are, in effect, resilient rings, the flutter is often more severe.

When an expander of the type mentioned above is inserted in a piston it sometimes becomes affected by the flutter of the skirt and begins a vibration of its own. This vibration of the expander may cause it to become dislodged from its proper place in the piston and the movement of the expander and skirt relative to one another may cause severe injury to both.

I have found that this flutter of the expander may be damped out if the expander is placed under a tension different from that needed to create an expansive force on the piston skirt. Therefore, the objects of my invention are to provide an expander having a resilient means creating a tension between the expander and the piston other than the tension of the expander to exert an expansive force and to provide a piston expander which will be simple in construction, cheap in manufacture and efficacious in operation.

Figure 1:
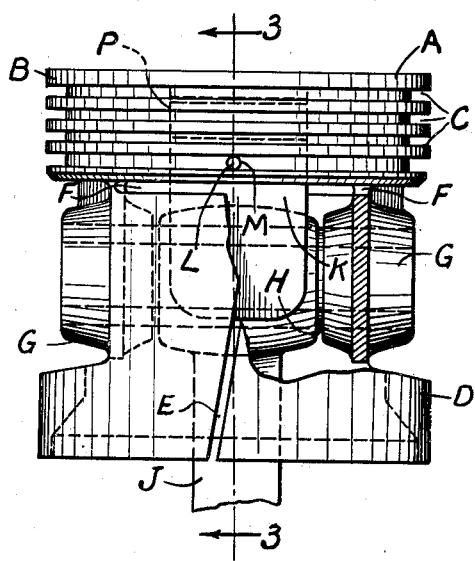
Figure 3:
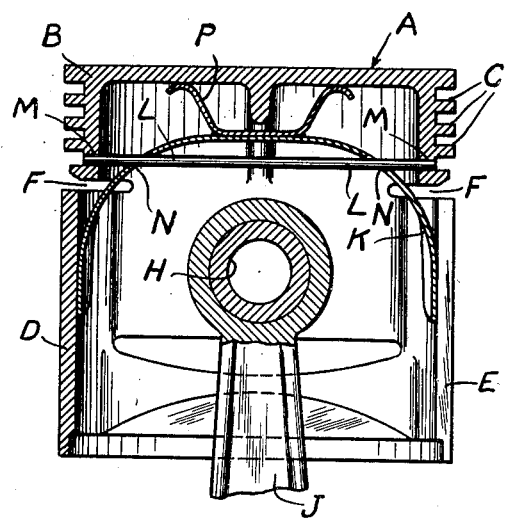
Figure 2:
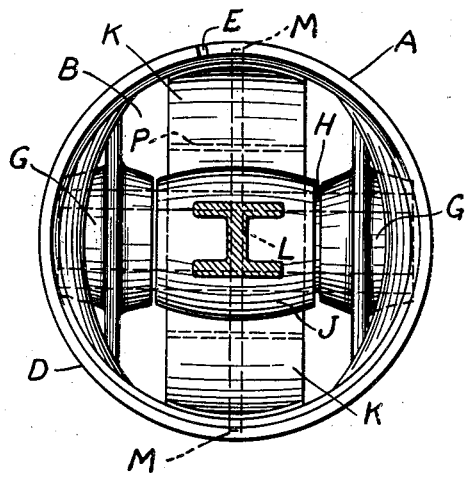
Figure 4:
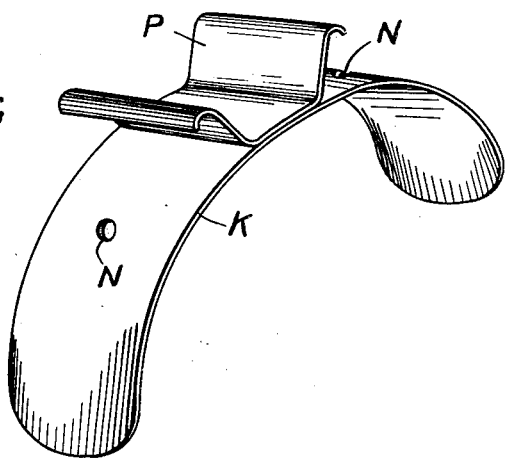

In the accompanying drawing wherein similar characters are used to designate similar parts, I have shown a simple embodiment of my invention. In this drawing, Fig. 1 is a view of a piston with the expander mounted therein; Fig. 2 is a bottom view of the assembled structure as shown in Fig. 1; Fig. 3 is a section along the line 3—3 in Fig. 1; and Fig. 4 is a view of the expander removed from the piston.

Referring to the figures the piston A comprises a head B having the usual ring grooves C formed therein and the piston also includes a resilient skirt D split axially as at E and separated from the head B throughout a major portion of its periphery by circumferentially extending slots F. The piston also includes the usual bosses G to receive the pin H upon which the connecting rod J is mounted.

In this embodiment of my invention, the expander for the piston skirt comprises a U-shaped resilient member K having a pair of legs which engage the skirt D at substantially diametrically opposed points each, preferably, removed substantially ninety degrees from the bosses G. The expander K is maintained in place within the hollow interior of the piston by a rod L extending diametrically across the piston head and mounted in holes M formed in the bottom of a ring groove C. The rod L projects through aligned apertures N in the expander K so that the expander will be securely mounted to the head of the piston.

Secured to the upper part of the U-shaped expander K by welding or by any other suitable expedient is a resilient part P which, as shown, may be U-shaped and which has the curved ends thereof arranged to engage the inner surface of the top wall of the head B. The part P is proportioned so that it will create a tension between the expander and the head to damp out any vibration or flutter of the expander.

It will be apparent that in the expander, as shown, a tension will be created between the head of the piston and the expander different from that creating an expansive force against the piston skirt. In this specification I have shown and described only a simple embodiment of my invention, but I do not propose to limit myself to any particular form or arrangement of the parts because the resilient part P may be of any shape or size and, of course, the type of expander used in conjunction therewith may be varied within wide limits without deviating from the spirit of my invention as included in the appended claims.

What I claim as new and desire to secure by Letters Patent, is:—

1. A piston expander comprising a member engaging the piston skirt and adapted to exert an expansive force to increase the effective diameter of said skirt, said member being adapted to receive a rod whereby said member is held in said piston, and a resilient part carried by said member and engaging the head of said piston to create a tension between said expander and said head.

2. A piston expander comprising a member engaging the piston skirt and adapted to exert an expansive force to increase the effective diameter of said skirt, supporting means arranged to hold said expander in said piston, and a resilient part carried by said member and additional thereto and engaging the head of said piston to create a tension between said expander and said head other than the expansive force exerted by said member whereby flutter of said expander is damped.

3. A piston expander comprising a member engaging the piston skirt at diametrically opposed points and adapted to exert an expansive force to increase the effective diameter of said skirt, supporting means arranged to hold said expander in said piston, and a resilient part carried by said member and additional thereto and engaging the head of said piston to create a tension between said expander and said head other than the expansive force exerted by said member whereby flutter of said expander is damped.

4. A piston expander comprising a U-shaped member having a pair of legs each adapted to engage the piston skirt and to exert an expansive force to increase the effective diameter thereof, supporting means arranged to hold said expander in said piston, and a resilient part carried at the top of said member and additional thereto and engaging the head of said piston to create a tension between said expander and said head other than the expansive force exerted by said member whereby flutter of said expander is damped.

DALLAS M. SMITH.